United States Patent
Aoyagi et al.

(10) Patent No.: US 10,242,451 B2
(45) Date of Patent: Mar. 26, 2019

(54) ON-VEHICLE CAMERA CALIBRATION AUXILIARY DEVICE

(71) Applicant: Mitsubishi Electric Corporation, Tokyo (JP)

(72) Inventors: Takahisa Aoyagi, Tokyo (JP); Koji Iida, Tokyo (JP); Noritaka Kokido, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 109 days.

(21) Appl. No.: 15/270,310

(22) Filed: Sep. 20, 2016

(65) Prior Publication Data

US 2017/0345159 A1    Nov. 30, 2017

(30) Foreign Application Priority Data

May 24, 2016    (JP) .................................. 2016-103049

(51) Int. Cl.
| | |
|---|---|
| *B60Q 1/00* | (2006.01) |
| *H04N 7/18* | (2006.01) |
| *G06T 7/207* | (2017.01) |
| *G06T 7/223* | (2017.01) |

(52) U.S. Cl.
CPC ............ *G06T 7/207* (2017.01); *B60Q 1/0029* (2013.01); *G06T 7/223* (2017.01); *H04N 7/183* (2013.01); *G06T 2207/30252* (2013.01)

(58) Field of Classification Search
CPC ..................... G06T 7/207; G06T 7/223; G06T 2207/30252; B60Q 1/0029; H04N 7/183
See application file for complete search history.

(56) References Cited

U.S. PATENT DOCUMENTS

| | | | |
|---|---|---|---|
| 2004/0141063 A1* | 7/2004 | Maeda | H04N 13/0246 348/207.99 |
| 2014/0320658 A1* | 10/2014 | Pliefke | B60R 1/002 348/148 |

FOREIGN PATENT DOCUMENTS

JP    2014-174067 A    9/2014

* cited by examiner

*Primary Examiner* — Huy T Nguyen
(74) *Attorney, Agent, or Firm* — Sughrue Mion, PLLC; Richard C. Turner (57) ABSTRACT

To perform an ideal calibration operation, a start switch started manually or by an on-vehicle camera calibration device, a start switching device started by an operation of the start switch and projection devices installed in an outer periphery of a vehicle body, including at least one or more light sources irradiating the surroundings of the vehicle body with light are provided, in which whether a calibration operation is possible or not is determined based on references on a road surface projected by the projection devices.

9 Claims, 10 Drawing Sheets

☼ LASER POSITION
☆ LASER IRRADIATION POINT (ROAD SURFACE)
--- LASER LIGHT BASELINE
— BASELINE FOR CALIBRATION

FIG.2B

☼ LASER POSITION
☆ LASER IRRADIATION POINT (ROAD SURFACE)
--- LASER LIGHT BASELINE
— BASELINE FOR CALIBRATION

FIG.3A

WALL SURFACE PROJECTION IMAGE (SIDE SURFACE)

○ PRESSURIZED POINT
― BASELINE FOR CALIBRATION
▭ PRESSURE SENSOR-TYPE LIQUID CRYSTAL PANEL

FIG.10B

○ PRESSURIZED POINT
― BASELINE FOR CALIBRATION
▭ LIQUID CRYSTAL PANEL WITH PRESSURE SENSORS

ON-VEHICLE CAMERA CALIBRATION AUXILIARY DEVICE

BACKGROUND OF THE INVENTION

Field of the Invention

The present invention relates to a calibration auxiliary device of an on-vehicle camera which is mounted on a vehicle.

Description of the Related Art

In a front monitoring camera or an environmental monitoring camera mounted on a vehicle as a device of one of advanced driver assistance systems (hereinafter referred to as ADAS), functions of accurate calculation of positional precision or detection such as vehicle detection, pedestrian detection and white line detection are reduced when an optical axis position of the camera is deviated due to lapse of time and so on. In response to the problems, there is proposed a calibration device including an extraction section extracting a feature point of a vehicle from a contour image of the vehicle taken by an on-vehicle camera, an estimation section identifying a lens center point of the on-vehicle camera and a point on an extension line passing through the feature point, a storage section storing the lens center point of the on-vehicle camera which is mounted on the vehicle at an ideal position and in an ideal direction, and an ideal point on the line passing through the feature point, and an adjustment section adjusting the on-vehicle camera so as to minimize the distance between the point on the extension line and the ideal point (refer to Patent Document 1).

[Patent Document 1] JP-A-2014-174067

However, in the above related-art calibration device, there are constraints that part of the vehicle to be a feature point has to be captured on an angle of view of the on-vehicle camera, and that part of the vehicle to be the feature point has to keep the relationship of an absolute position with respect to the position of the on-vehicle camera. Therefore, there is a problem that it is necessary to set the camera so as to satisfy the above constraints at the time of setting the camera, which reduces the degree of freedom in setting the camera. There is also a problem that a detection area to be detected is narrowed for capturing part of a vehicle body within a detection range of the camera. That is, in the case where part of the vehicle as the feature point is deformed or damaged due to some reasons, ideal calibration operation is not performed. Furthermore, it is necessary to incorporate the calibration device in an electronic control unit (hereinafter referred to as ECU) for controlling the on-vehicle camera in order to realize the above related-art calibration device, and there is a problem that it is difficult to be applied to an existing on-vehicle camera system which has been commercially available.

SUMMARY OF THE INVENTION

The present invention has been made in view of the above problems, and an object thereof is to provide a calibration auxiliary device capable of being applied to an existing on-vehicle camera system as there is no constraint on the angle of view of the on-vehicle camera as well as capable of realizing the operation of calibration with high accuracy while saving the trouble.

According to an embodiment of the present invention, there is provided an on-vehicle camera calibration auxiliary device including a start switch started manually or by an on-vehicle camera calibration device, a start switching device started by an operation of the start switch and projection devices installed in an outer periphery of a vehicle body, including at least one or more light sources irradiating the surroundings of the vehicle body with light, in which whether a calibration operation is possible or not is determined based on references on a road surface projected by the projection devices.

As whether the calibration operation is possible or not can be determined without using a measuring devise such as a measure or a protractor by using the on-vehicle camera calibration auxiliary device according to the embodiment, the trouble relating to the on-vehicle camera calibration operation by the user can be reduced and the calibration operation with less variation of accuracy can be realized.

The foregoing and other objects, features, aspects and advantages of the present invention will become more apparent from the following detailed description of the present invention when taking in conjunction with the accompanying drawings.

DESCRIPTION OF EMBODIMENTS

Embodiment 1

Hereinafter, the present invention will be explained with reference to the drawings.

Figure 1:
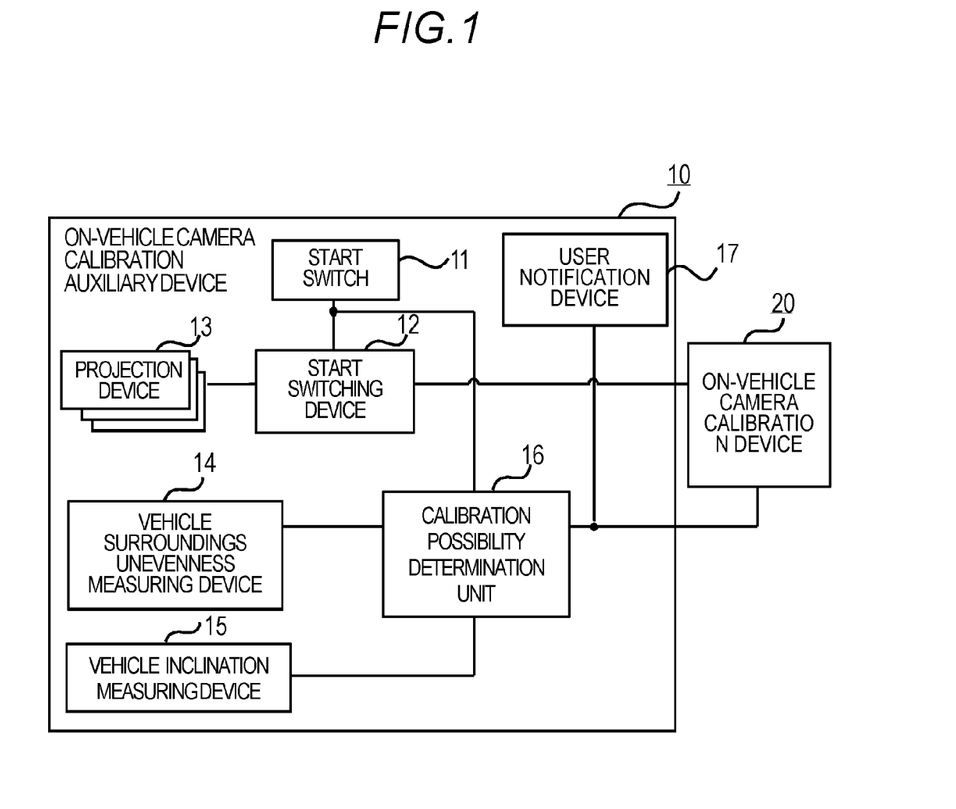
FIG. 1 is a block diagram showing a schematic configuration of an on-vehicle calibration auxiliary device according to Embodiment 1 of the present invention.
Figure 2A:
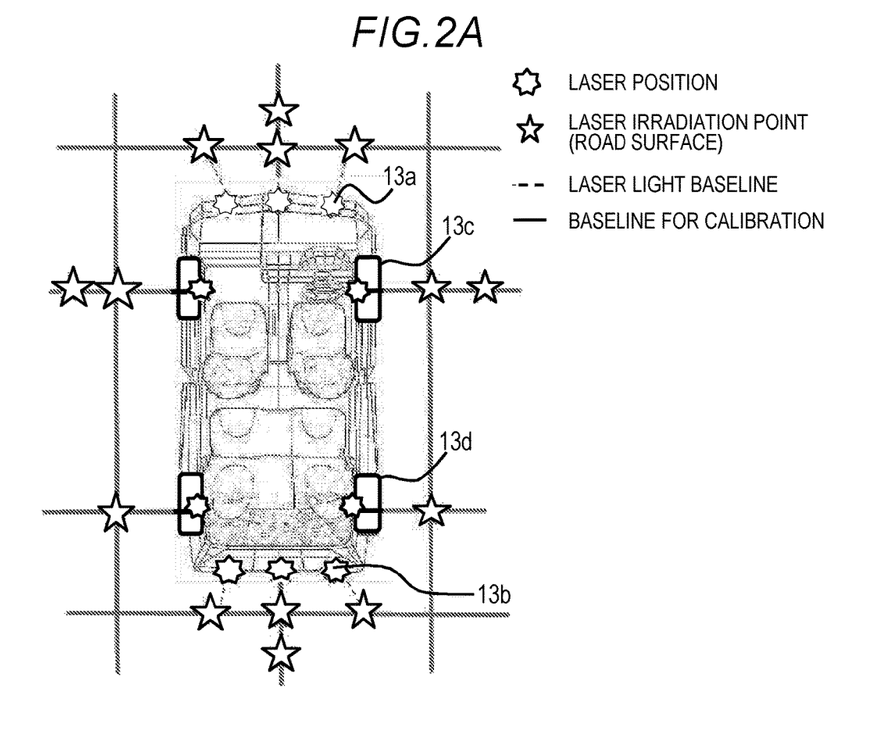
FIG. 2A and FIG. 2B are a plan view and a front view showing an outline for explaining operations of relevant parts of the calibration auxiliary device according to Embodiment 1 of the present invention.
Figure 2B:
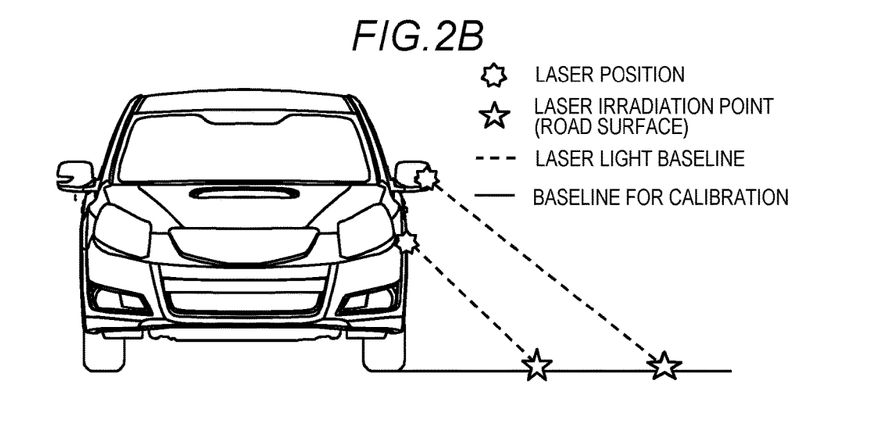
Figure 3A:
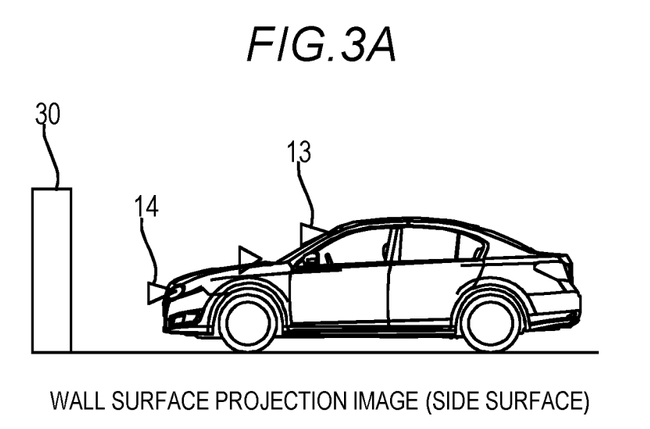
FIG. 3A is a side view showing an outline for explaining operations of relevant parts of the calibration auxiliary device according to Embodiment 1 of the present invention.
Figure 3B:
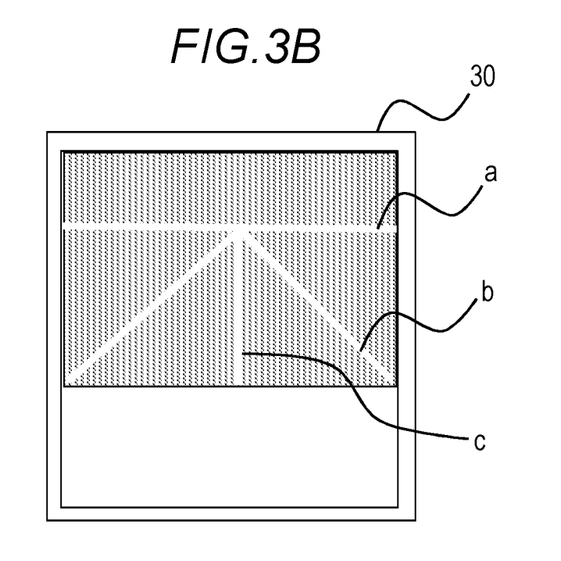
FIG. 3B is a front view showing a projection pattern in FIG. 3A.
Figure 4:
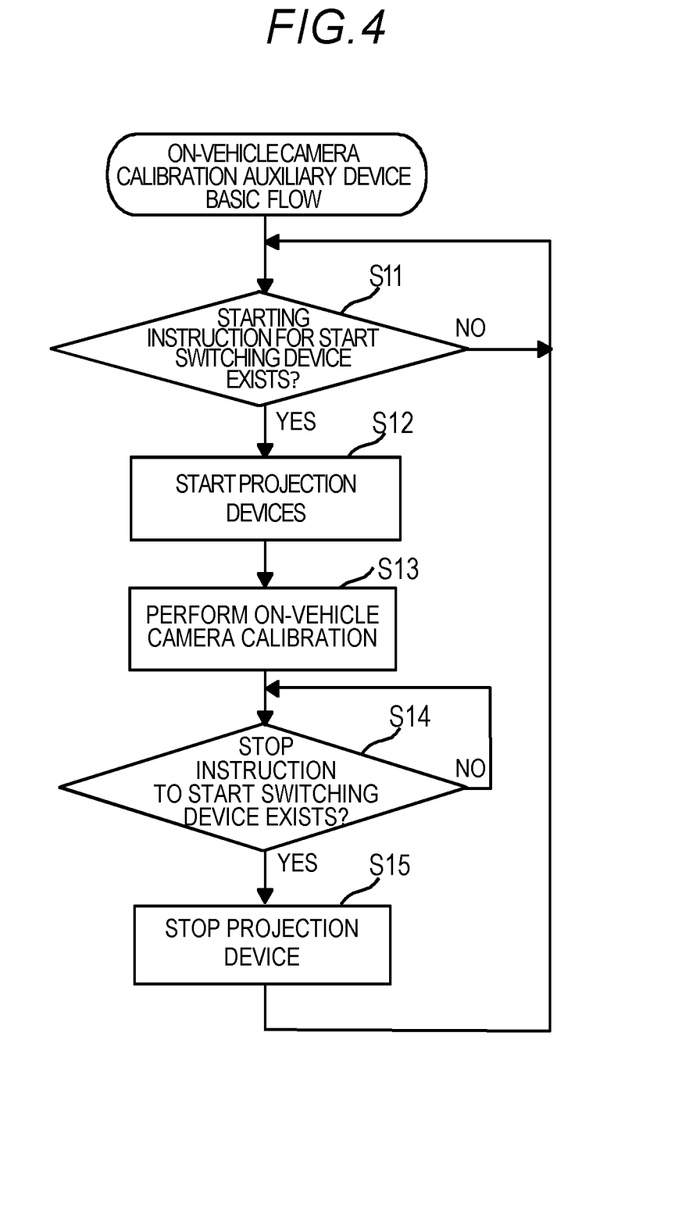
FIG. 4 is a flowchart for explaining basic operations of the calibration auxiliary device according to Embodiment 1 of the present invention.
Figure 5:
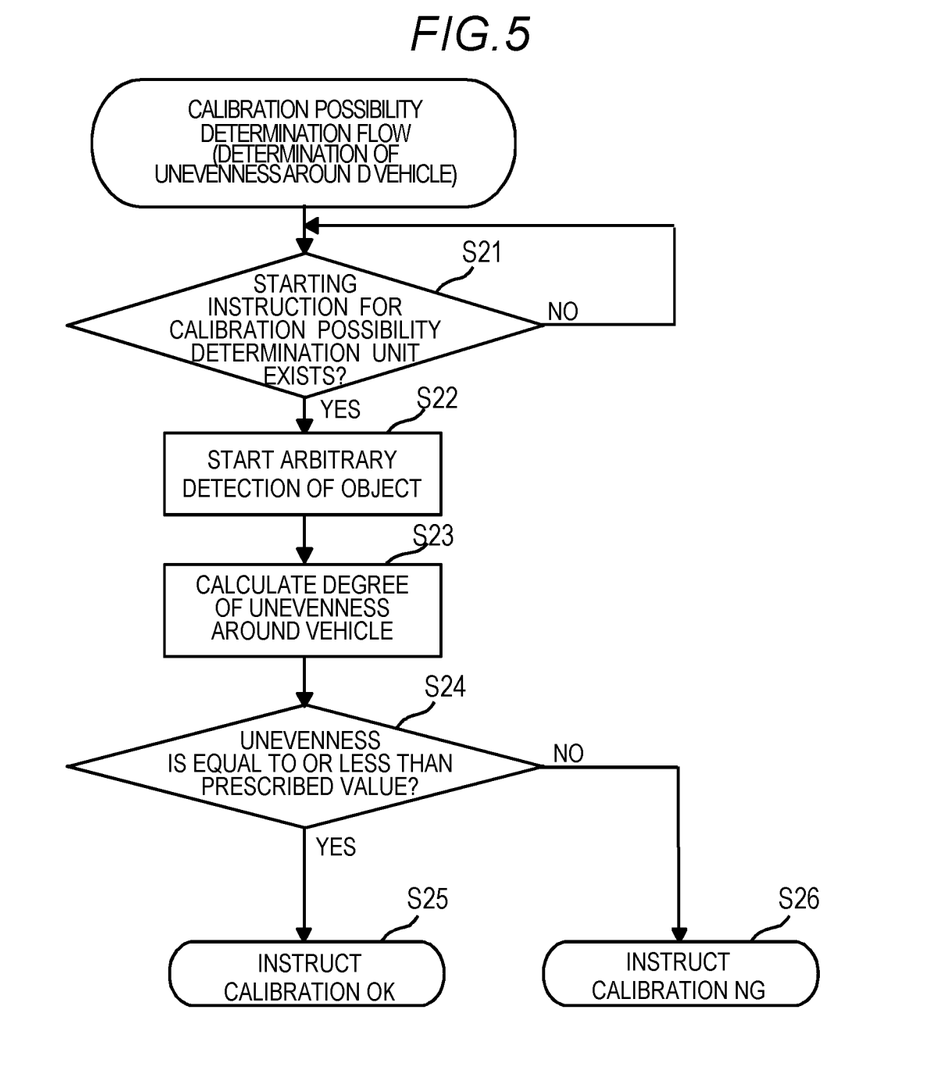
FIG. 5 is a flowchart for explaining operations of relevant parts of the calibration auxiliary device according to Embodiment 1 of the present invention.
Figure 6:
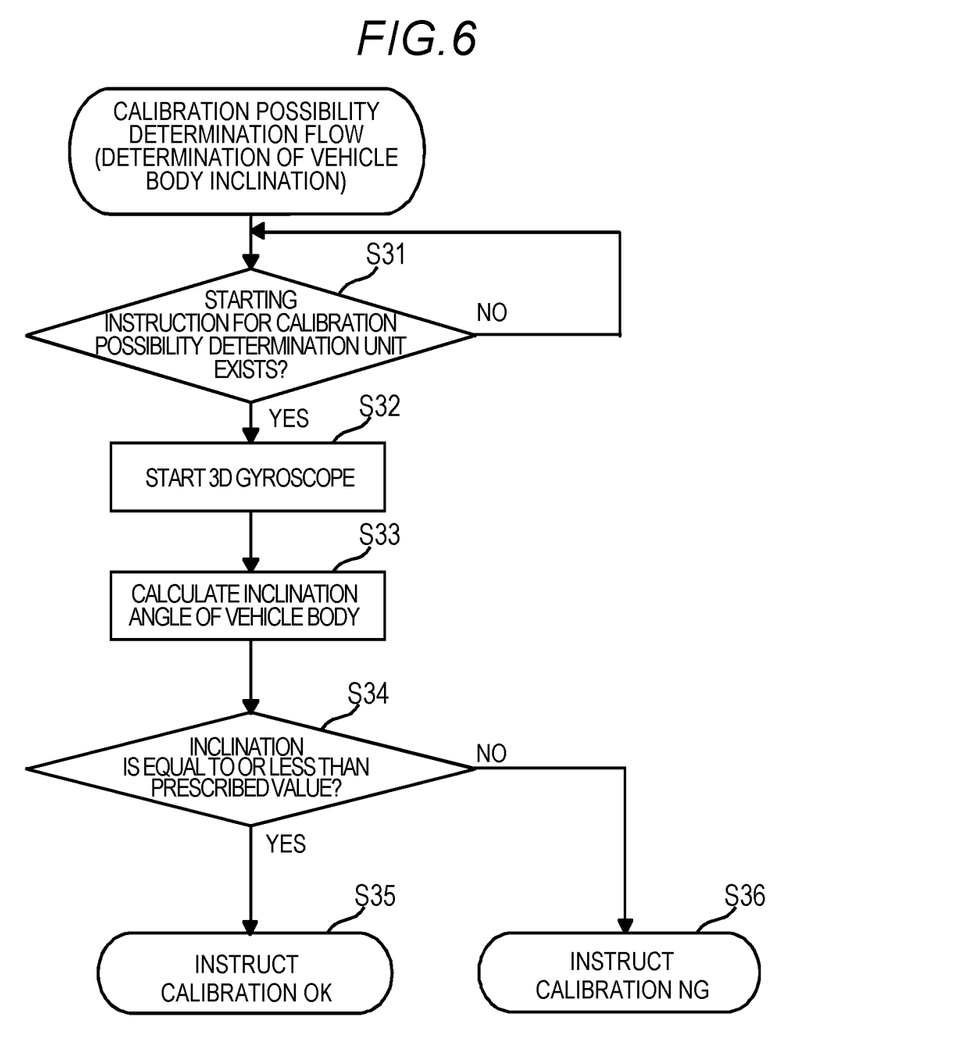
FIG. 6 is a flowchart showing operations of relevant parts of the calibration auxiliary device according to Embodiment 1 of the present invention.

FIG. 1 is a block diagram showing a schematic configuration of a calibration auxiliary device according to Embodiment 1 of the present invention, FIG. 2A and FIG. 2B are a plan view and a front view showing an outline for explaining operations of relevant parts of the calibration auxiliary device according to Embodiment 1 of the present invention, FIG. 3A is a side view showing an outline for explaining operations of relevant parts of the calibration auxiliary device according to Embodiment 1 of the present invention and FIG. 3B is a front view showing a projection pattern in FIG. 3A. FIG. 4 is a flowchart for explaining basic operations of the calibration auxiliary device according to Embodiment 1 of the present invention, FIG. 5 is a flowchart for explaining operations of relevant parts of the calibration auxiliary device according to Embodiment 1 of the present invention and FIG. 6 is a flowchart showing operations of relevant parts of the calibration auxiliary device according to Embodiment 1 of the present invention.

In respective drawings, the same symbols denote the same or equivalent compositions.

In FIG. 1, an on-vehicle camera calibration auxiliary device 10 is mounted on a vehicle, which is connected to a camera calibration device 20 formed by a camera ECU or an ADAS_ECU to assist operations of the on-vehicle camera calibration device 20.

The on-vehicle camera calibration auxiliary device 10 includes a start switch 11 started manually or by the ECU in the on-vehicle camera calibration device 20, a start switching device 12 started by an operation of the start switch 11, projection devices 13 installed in an outer periphery of a vehicle body, which are started based on an output of the start switching device 12 and formed by point light sources projecting reference lines prescribed with respect to a vehicle body on a road or on the surroundings, a vehicle surroundings unevenness measuring device 14 detecting unevenness around the vehicle based on the reference lines on the road surface projected by the projection device 13 to determine whether the degree of unevenness is equal to or less than an acceptable value or not, a vehicle inclination measuring device 15 measuring inclination of the vehicle based on the reference lines projected by the projection device 13 to determine whether the degree of inclination is equal to or less than an acceptable value or not, a calibration possibility determination unit 16 determining whether the operation of the calibration device can be normally performed or not based on outputs of the vehicle surroundings unevenness measuring device 14 and the vehicle inclination measuring device 15, and a user notification device 17 displaying whether the operation of the calibration device can be normally performed or not based on an output of the calibration possibility determination unit 16.

Here, the calibration possibility determination unit 16 is formed by a microcomputer.

The user notification device 17 may be a monitor screen or a speaker mounted on the vehicle, which notifies whether the calibration operation can be normally performed or not by the display on the monitor screen or the audio from the speaker.

Next, operations of the on-vehicle camera calibration auxiliary device 10 having the above configuration will be explained with reference to FIG. 4.

In a case where a user desires to start the on-vehicle camera calibration device, first, the start switch 11 is inputted at arbitrary timing to start the start switching device 12 (Step S11), then, the projection devices 13 installed in the vehicle body are started based on the output of the start switching device 12, and a projection pattern by laser light and so on is projected (Step S12).

The starting operation may be set so that the output is generated at prescribed timing in the camera ECU or the ADAS_ECU of the on-vehicle camera calibration device 20 to operate the start switch 11 by the output.

Here, the projection devices 13 set projection patterns as shown in, for example, FIG. 2A and FIG. 2B.

That is, as shown in FIG. 2A and FIG. 2B, the projection devices 13 are respectively installed at, for example, a front bumper part 13a, a rear bumper part 13b, a front fender part 13c and a rear fender part 13d. At least one light source to be the projection device 13 is preferably installed at each place. The projection pattern by the projection devices 13 is set as point irradiation, markers indicated by star marks in the drawings are displayed at positions on the road surface. When lines are drawn along these star marks, calibration baselines necessary for the calibration operation can be drawn without using a measuring device such as a measure or a protractor can be drawn. The user can determine the possibility of the calibration operation by seeing the calibration baselines. Also in the case where a laser light projector is used as the projection device 13 to be a linear irradiation type, the projection pattern is displayed in positions on the road surface, therefore, the user can also determine the possibility of the calibration operation without using the measuring device and so on at all.

When the calibration operation of a front monitor camera is performed, wall-surface irradiation as shown in FIG. 3A and FIG. 3B can be used. That is, the projection device 13 projects a projection pattern including a baseline "a" which is horizontal to the ground, a baseline "b" extending in parallel to the vehicle and a baseline "c" vertical to the ground with respect to a wall surface 30 in front of the vehicle by using the laser light projector. The projection patterns shown in FIG. 2A, FIG. 2B, FIG. 3A and FIG. 3B are examples, which are formed in accordance with specifications of the on-vehicle camera of the vehicle.

Next, in Step S13, an on-vehicle camera calibration operation is started based on the result of determination of the calibration baselines by the projection device 13. In the case where the output from the start switching device 12 continues in this state, the operation is continued. When the stop is outputted (Step S14), the operation of the projection devices 13 is stopped. (Step S15)

Next, the calibration possibility determination unit 16 is driven by the output from the start switching device 12 as shown in FIG. 5 (Step S21), the vehicle surroundings unevenness measuring device 14 is operated and an object around the vehicle body is detected (Step S22). Here, the vehicle surroundings unevenness measuring device 14 measures the degree of unevenness of a subject surface (the road surface or the wall surface) around the vehicle (Step S23), and the calibration possibility determination unit 16 determines whether the unevenness around the vehicle is within an acceptable value or not based on the measurement result (Step S24).

When the unevenness around the vehicle is equal to or less than the acceptable value as the result of determination, the calibration possibility determination unit 16 determines that the calibration is possible, notifying the user notification device 17 that the calibration is possible (Step S25).

On the other hand, when the determination result exceeds the acceptable value, the calibration possibility determination unit 16 determines that the calibration is inaccurate, notifying the user notification device 17 that the calibration operation is inaccurate (for example, "it is difficult to perform accurate calibration here, please move to a flatter place and perform calibration again" and so on) (Step S26).

The vehicle inclination measuring device 15 starts a 3D gyroscope (Step S32) as shown in FIG. 6, measuring inclination of a target vehicle (Step S33).

The calibration possibility determination unit 16 determines whether the inclination of the vehicle is within an acceptable value or not based on the measurement result (Step S34).

Next, when the inclination around the vehicle is equal to or less than the acceptable value as a result of the determination, the calibration possibility determination unit determines that the calibration is possible, notifying the user notification device 17 that the calibration operation is possible (Step S35).

On the other hand, when the determination result exceeds the acceptable value, the calibration possibility determination unit 16 determines that the calibration is inaccurate, notifying the user notification device 17 that the calibration operation is inaccurate in the same manner as the above (Step S36).

After the calibration operation ends, the user can stop the device at arbitrary timing by the start switch 11 of the on-vehicle camera calibration auxiliary device 10 and the user can stop the device by the camera ECU or the ADAS-_ECU of the on-vehicle camera calibration device 20.

As the projection pattern by the projection devices 13 is judged by the user or determined by the calibration possibility determination unit 16 according to Embodiment 1 as described above, it is not necessary that part of the vehicle to be projected is captured, therefore, an angle of view of the camera can be adopted to a detection range, and the detection range can be used at the maximum.

As described above, the user can perform the calibration operation without using the measuring device and so on at all by the on-vehicle camera calibration auxiliary device according to Embodiment 1 of the present invention.

Embodiment 2

Figure 7:
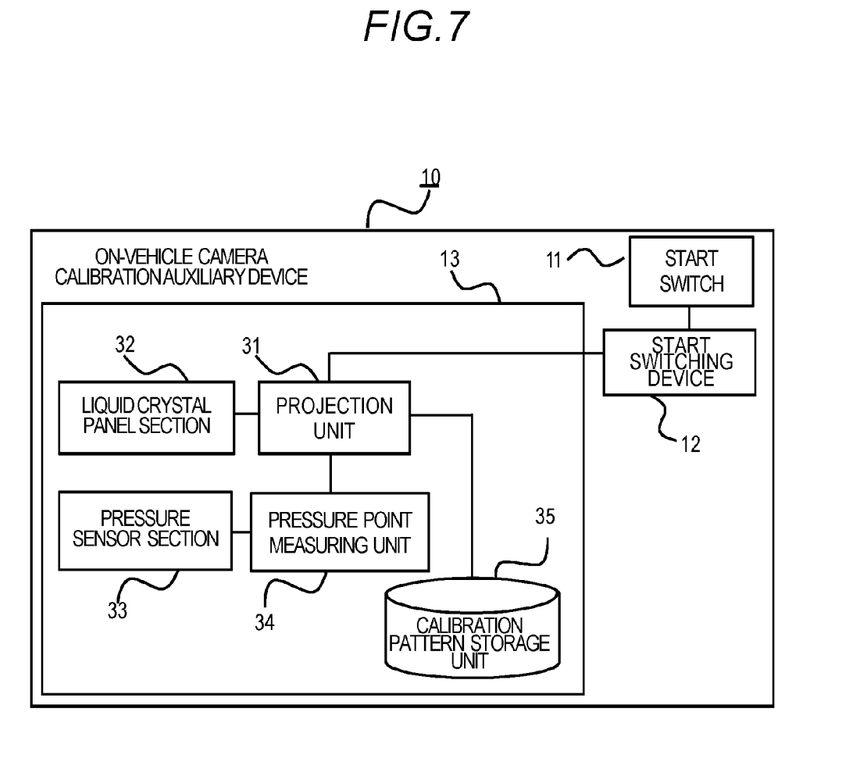
FIG. 7 is a block diagram showing a schematic configuration of an on-vehicle camera calibration auxiliary device according to Embodiment 2 of the present invention.
Figure 8:
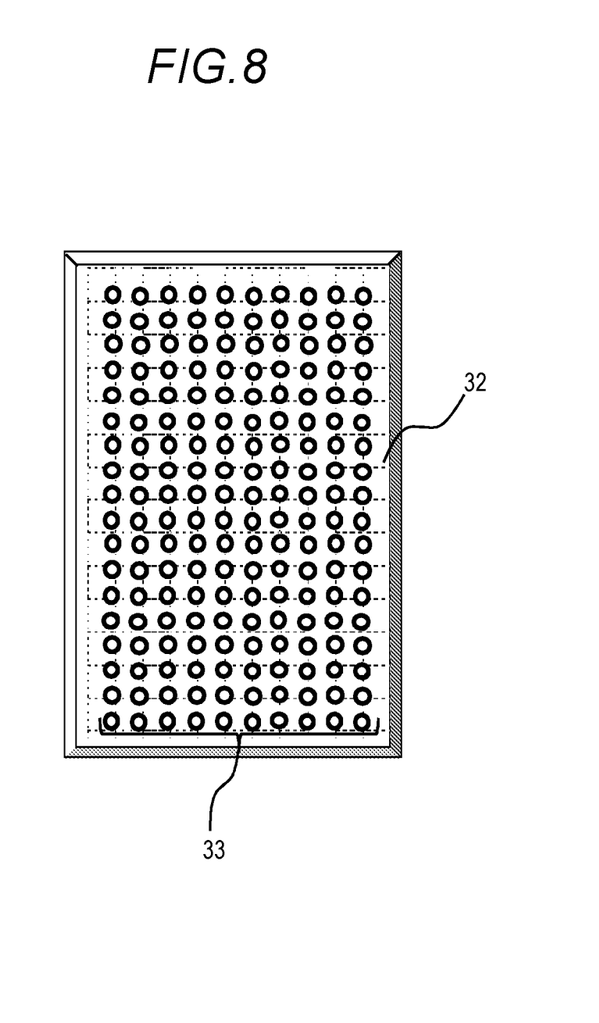
FIG. 8 a plan view showing a structure of a relevant part of the calibration auxiliary device according to Embodiment 2 of the present invention.
Figure 9:
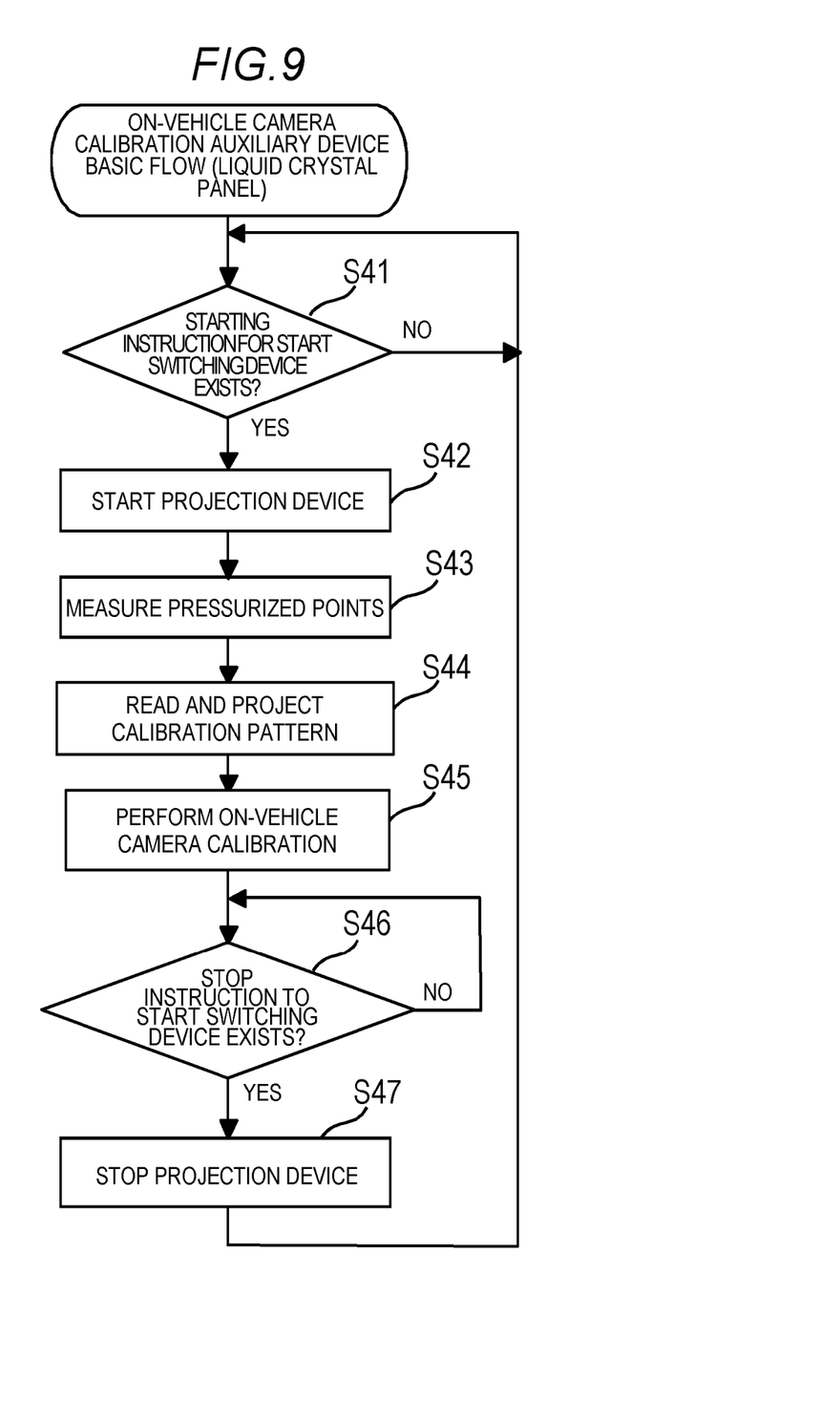
FIG. 9 is a flowchart for explaining basic operations of the calibration auxiliary device according to Embodiment 2 of the present invention.
Figure 10A:
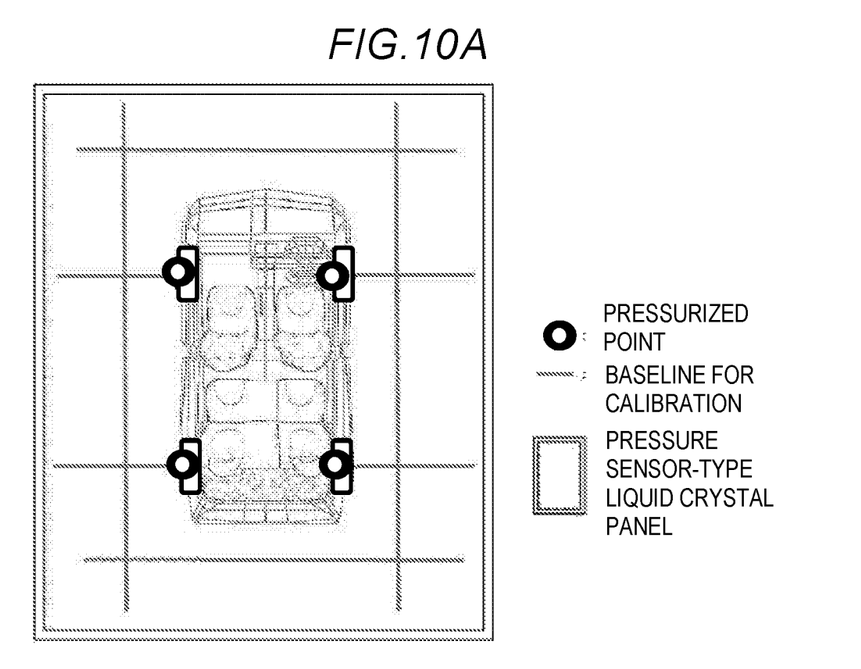
FIG. 10A and FIG. 10B are a plan view and a front view showing an outline for explaining operations of relevant parts of the calibration auxiliary device according to Embodiment 2 of the present invention.
Figure 10B:
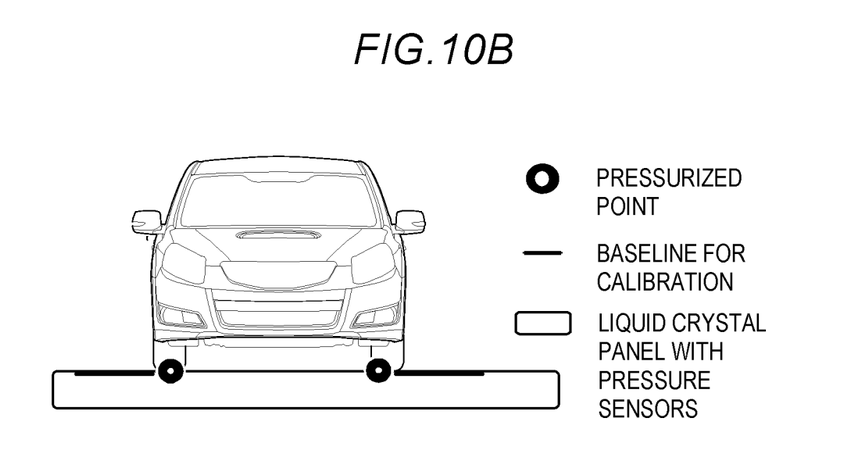

FIG. 7 is a block diagram showing a schematic configuration of an on-vehicle camera calibration auxiliary device according to Embodiment 2 of the present invention, FIG. 8 a plan view showing a structure of a relevant part of the calibration auxiliary device according to Embodiment 2 of the present invention, FIG. 9 is a flowchart for explaining basic operations of the calibration auxiliary device according to Embodiment 2 of the present invention, FIG. 10A and FIG. 10B are a plan view and a front view showing an outline for explaining operations of relevant parts of the calibration auxiliary device according to Embodiment 2 of the present invention.

In FIG. 7, the on-vehicle camera calibration auxiliary device 10 includes a start switch 11 started manually or by the ECU in the on-vehicle camera calibration device, a start switching device 12 started by the operation of the start switch 11, and a projection device 13 started based on an output of the start switching device 12.

The projection device 13 includes a projection unit 31 formed by a laser light projector which projects prescribed baselines (laser light and so on) to the vehicle body on a road surface or on the surroundings, a liquid crystal panel section 32 installed on a flat surface in the outside of the vehicle body, a pressure sensor section 33 formed by plural pressure sensors provided on the liquid crystal panel section 32, a pressure point measuring unit 34 to which the output of the pressure sensor section 33 is supplied and which detects pressure points by the weight of the vehicle body, and a calibration pattern storage unit 35 previously storing calibration patterns in accordance with measurement targets. The liquid crystal panel section 32 and the pressure sensor section 33 are configured so that plural pressure sensors are arranged on a surface of the liquid crystal panel section 32, for example, as shown in FIG. 8.

Next, operations of the on-vehicle camera calibration auxiliary device having the above configuration will be explained with reference to FIG. 9.

First, when the start switch 11 is inputted after the vehicle to be measured is set on the liquid crystal panel 32 of the projection device 13, the projection device 13 is started by the start switching device 12 (Step S42), the pressure sensor section 33 outputs output values of respective pressure sensors corresponding to the existence of tires of the vehicle (Step S43).

At this time, the pressure sensors in the pressure sensor section 33 corresponding to tire positions of the vehicle to be measured indicate higher numerical values than pressure values of other sensors in the pressure sensor section 33, and the measurement result is detected by the pressure point measuring unit 34 (Step S43).

That is, the pressure point measuring unit 34 determines pressurized points (namely, tire positions) indicating higher numerical values than other pressure sensors from the measurement results of pressure values of respective pressure sensors, notifying the determination result as the tire positions to the projection unit 31.

Next, the projection unit 31 reads a calibration pattern corresponding to the target vehicle from the calibration pattern storage unit 35 based on the notified determination result indicating the tire positions, projecting the on-vehicle camera calibration pattern as shown in FIG. 10A and FIG. 10B on the liquid crystal panel section 32 by the projection unit 31 (Step S44).

The user can decided to start the calibration operation by referring to the on-vehicle camera calibration pattern, determining whether the calibration operation is allowed. When the operation is allowed, the user makes the on-vehicle camera calibration device perform the operation (Step S45).

In the case where the liquid crystal panel section 32 is installed on a slope, the calibration pattern based on the determination result is not stored in the calibration pattern storage unit 35, therefore, the projection unit 31 does not project the on-vehicle camera calibration pattern to indicate that the situation is unsuitable for the calibration operation.

Lastly, when the start switching device 12 receives a stop instruction (Step S46), the operation of the projection device 13 is stopped (Step S47).

As the contents of the calibration operation, the calibration operation may be performed in accordance with a calibration method corresponding to each vehicle to be measured.

As the pressure sensor-type liquid crystal panel of the projection device is fixed so as to be constantly horizontal in Embodiment 2, it is not necessary to use the vehicle surroundings unevenness measuring device 14 and the vehicle inclination measuring device 15 shown in Embodiment 1.

Furthermore, the calibration pattern can be displayed on the liquid crystal panel section 32 in accordance with tire positions also in vehicle types having different tire widths and different intervals between front tires and rear tires by using the liquid crystal panel section 32 including the pressure sensor section 33, therefore, the start of calibration operations corresponding to plural vehicle types can be determined on the same plane.

As described above, it is possible to provide the on-vehicle camera calibration auxiliary device capable of realizing the calibration operation without using the measuring devices and so on at all while saving the trouble of the user at the time of performing the calibration operation.

Various modifications and alterations of this invention will be apparent to those skilled in the art without departing from the scope and spirit of this invention, and it should be understood that this is not limited to the illustrative embodiments set forth herein.

What is claimed is:

1. An on-vehicle camera calibration auxiliary device comprising:
a start switch started manually or by an on-vehicle camera calibration device;
a start switching device started by an operation of the start switch; and
projection devices installed in an outer periphery of a vehicle body, including at least one or more light sources irradiating the surroundings of the vehicle body with light,
wherein whether a calibration operation is possible or not is determined based on at least one of unevenness around a vehicle and an inclination of the vehicle, determined from references on a road surface projected by the projection devices.

2. The on-vehicle camera calibration auxiliary device according to claim 1,
wherein the projection devices are two or more point-irradiation type or one or more linear-irradiation type laser light sources provided on respective surfaces in the front, the back, right and left sides of the vehicle body.

3. The on-vehicle camera calibration auxiliary device according to claim 1,
wherein a laser light projector is used as a light source of the projection device.

4. The on-vehicle camera calibration auxiliary device according to claim 1, further comprising:
a vehicle surroundings unevenness measuring device measuring the unevenness around the vehicle based on reference lines on the road surface projected by the projection devices;
a calibration possibility determination unit determining whether the measurement result is equal to or less than an acceptable value or not based on an output of the vehicle surroundings unevenness measuring device; and
a user notification device notifying a user of the determination result of the calibration possibility determination unit.

5. The on-vehicle camera calibration auxiliary device according to claim 1, further comprising:
a vehicle inclination measuring device measuring the inclination of the vehicle based on reference lines on the road surface projected by the projection devices;
a calibration possibility determination unit determining whether the measurement result is equal to or less than an acceptable value or not based on an output of the vehicle inclination measuring device; and
a user notification device notifying a user of the determination result of the calibration possibility determination unit.

6. An on-vehicle camera calibration auxiliary device comprising:
a start switch started manually or by an on-vehicle camera calibration device;
a start switching device started by an operation of the start switch;
a projection device installed in an outer periphery of a vehicle body, including at least one or more light sources irradiating the surroundings of the vehicle body with light;
a pressure sensor section having plural sensors which detect the weight of the vehicle body;
a liquid crystal panel section supporting the pressure sensor; and
a pressure point measurement unit measuring a pressure corresponding to a tire position of the vehicle body as a pressurized point by the pressure sensor,
wherein the projection device projects straight lines for determining a calibration operation around the vehicle so as to correspond to the pressure point measurement unit.

7. The on-vehicle camera calibration auxiliary device according to claim 1, wherein the on-vehicle camera calibration device is an electronic control unit which starts the start switch.

8. The on-vehicle camera calibration auxiliary device according to claim 1, further comprising a processor which determines whether or not the calibration operation can be performed based on the references on the road surface.

9. An on-vehicle camera calibration auxiliary device comprising:
a plurality of projection devices installed in an outer periphery of a vehicle body and comprising at least one or more light sources irradiating surroundings of the vehicle body with light;
a processor configured to:
determine at least one of an unevenness of the road surface and an inclination of a vehicle based on references on a road surface projected by the projection devices, and
determine whether the determined at least one the unevenness of the road surface and the inclination of the vehicle is within an acceptable value; and
a notification device, which, in response to the determining that the determined at least one the unevenness of the road surface and the inclination of the vehicle is within the acceptable value, notifies that the calibration operation is possible and which, in response to the determining that the determined at least one the unevenness of the road surface and the inclination of the vehicle is outside the acceptable value, notifies that the calibration operation cannot be accurately performed.

* * * * *